US012664217B2

(12) United States Patent
Zhang et al.

(10) Patent No.: US 12,664,217 B2
(45) Date of Patent: Jun. 23, 2026

(54) INFORMATION PROCESSING METHOD AND APPARATUS, TERMINAL, AND STORAGE MEDIUM

(71) Applicant: Beijing Zitiao Network Technology Co., Ltd., Beijing (CN)

(72) Inventors: Lu Zhang, Beijing (CN); Wenzong Ma, Beijing (CN); Xinlei Guo, Beijing (CN); Xiaolin Fang, Beijing (CN); Hao Huang, Beijing (CN); Liang Chen, Beijing (CN); Lanjin Zhou, Beijing (CN); Linghui Zhou, Beijing (CN); Yingtao Liu, Beijing (CN); Dirun Huang, Beijing (CN); Xuebing Zeng, Beijing (CN); Zejian Lin, Beijing (CN); Yingjie You, Beijing (CN); Yunzhao Tong, Beijing (CN); Yuxiang Chen, Beijing (CN); Jiawei Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 171 days.

(21) Appl. No.: 18/288,074

(22) PCT Filed: Apr. 27, 2022

(86) PCT No.: PCT/CN2022/089585
§ 371 (c)(1),
(2) Date: Oct. 24, 2023

(87) PCT Pub. No.: WO2022/242439
PCT Pub. Date: Nov. 24, 2022

(65) Prior Publication Data
US 2024/0202249 A1 Jun. 20, 2024

(30) Foreign Application Priority Data
May 17, 2021 (CN) .......................... 202110535366.9

(51) Int. Cl.
*G06F 3/048* (2013.01)
*G06F 3/0484* (2022.01)
(Continued)

(52) U.S. Cl.
CPC ........ *G06F 16/9038* (2019.01); *G06F 3/0484* (2013.01); *G06F 40/106* (2020.01); *G06F 40/166* (2020.01)

(58) Field of Classification Search
CPC ... G06Q 10/10; G06F 16/178; G06F 16/9038; G06F 3/04847; G06F 3/0481;
(Continued)

(56) References Cited

U.S. PATENT DOCUMENTS 7,574,669 B1 8/2009 Braun et al.
8,473,492 B1 * 6/2013 Biro ..................... G06F 16/156
707/758
(Continued)

FOREIGN PATENT DOCUMENTS

CN 102722519 A 10/2012
CN 103914529 A 7/2014
(Continued)

OTHER PUBLICATIONS

Alhenshiri et al., Building Support for Web Information Gathering Tasks, 2012, IEEE, 10 pages. (Year: 2012).*
(Continued)

*Primary Examiner* — Linh K Pham
(74) *Attorney, Agent, or Firm* — BakerHostetler

(57) ABSTRACT

The present invention provides an information processing method and apparatus, a terminal, and a storage medium. The information processing method comprises: in a display interface, acquiring at least one piece of first task information in response to a first operation event on a first control or a second control; creating a first content page on the basis
(Continued)

Acquiring at least one piece of first task information in response to a first operation event on a first control or a second control in the display interface — S11

Creating a first content page based on content information and type information of the first task information — S12 of content information and type information in the first task information, wherein the first content page is used for carrying association information of the first task information, the type information comprises first type information and/or second type information, and the second type information is associated with the first type information. The method in embodiments of the present invention can facilitate creation of the first content page matching the first task information by a user.

19 Claims, 6 Drawing Sheets

(51) Int. Cl.
| | | |
|---|---|---|
| *G06F 16/9038* | (2019.01) | |
| *G06F 40/106* | (2020.01) | |
| *G06F 40/166* | (2020.01) | |

(58) Field of Classification Search
CPC ...... G06F 40/166; G06F 3/0484; G06F 9/451; G06F 40/106; G06F 16/176; G06F 16/16
See application file for complete search history.

(56) References Cited

U.S. PATENT DOCUMENTS

| | | | |
|---|---|---|---|
| 10,572,496 B1* | 2/2020 | Frank ................... | G06F 3/04842 |
| 10,866,976 B1 | 12/2020 | Yoon et al. | |
| 11,210,349 B1* | 12/2021 | Schwartz ................ | G06F 16/94 |
| 11,644,955 B1* | 5/2023 | Singamneni .......... | G06F 3/0481 |
| | | | 707/722 |
| 2005/0289144 A1* | 12/2005 | Dettinger ............ | G06F 21/6227 |
| | | | 707/999.009 |
| 2007/0022111 A1* | 1/2007 | Salam ................... | G06F 16/951 |
| | | | 707/999.005 |
| 2009/0222763 A1* | 9/2009 | Dukhon .............. | G06F 3/04845 |
| | | | 715/808 |
| 2012/0110515 A1* | 5/2012 | Abramoff ............. | G06F 16/904 |
| | | | 715/854 |
| 2013/0007671 A1* | 1/2013 | Hammontree ........... | G06F 8/33 |
| | | | 715/853 |
| 2013/0298084 A1* | 11/2013 | Spivack ............. | G06Q 30/0251 |
| | | | 705/14.67 |
| 2014/0181697 A1* | 6/2014 | Kirigin ................... | G06F 3/048 |
| | | | 715/758 |
| 2014/0237357 A1* | 8/2014 | Meyer ................... | G06F 3/0481 |
| | | | 715/273 |
| 2014/0258972 A1* | 9/2014 | Savage ................... | G06F 9/451 |
| | | | 717/106 |
| 2014/0282901 A1* | 9/2014 | Dwan ................... | H04L 67/535 |
| | | | 726/4 |
| 2015/0019480 A1* | 1/2015 | Maquaire .............. | G06F 16/252 |
| | | | 707/609 |
| 2015/0019559 A1* | 1/2015 | Maquaire .............. | G06F 16/907 |
| | | | 707/740 |
| 2015/0186366 A1* | 7/2015 | Yan ...................... | G06F 16/2246 |
| | | | 707/741 |
| 2017/0200122 A1* | 7/2017 | Edson .................. | G06Q 10/101 |
| 2017/0293458 A1* | 10/2017 | Poel ....................... | H04N 7/152 |
| 2018/0011883 A1* | 1/2018 | Goldbrenner ........... | G06F 16/22 |
| 2018/0034879 A1* | 2/2018 | Chegini ................ | H04L 51/046 |
| 2018/0124155 A1* | 5/2018 | Ryzhkov ................ | G06Q 10/10 |
| 2018/0167451 A1* | 6/2018 | Yi ........................ | H04L 65/1069 |
| 2018/0309801 A1* | 10/2018 | Rathod .............. | H04M 3/5175 |
| 2018/0349006 A1* | 12/2018 | Lindley .............. | G06F 3/04847 |
| 2019/0057088 A1* | 2/2019 | Chander .............. | G06F 40/169 |
| 2020/0026783 A1* | 1/2020 | Watanabe ............. | G06F 16/176 |
| 2020/0104401 A1* | 4/2020 | Burnett ................ | G06F 16/287 |
| 2022/0201049 A1* | 6/2022 | Jamison ................ | H04L 65/403 |

FOREIGN PATENT DOCUMENTS

| | | |
|---|---|---|
| CN | 104794232 A | 7/2015 |
| CN | 105988816 A | 10/2016 |
| CN | 106796602 A | 5/2017 |
| CN | 112632917 A | 4/2021 |
| CN | 112632942 A | 4/2021 |

OTHER PUBLICATIONS

Written Opinion for International Application No. PCT/CN2022/089585, mailed Jul. 13, 2022, 09 Pages.
International Patent Application No. PCT/CN2022/089585; Int'l Search Report; dated Jul. 13, 2022; 2 pages.
China Patent Application No. 202110535366.9; Office Action; dated Apr. 1, 2026; 15 pages.

* cited by examiner

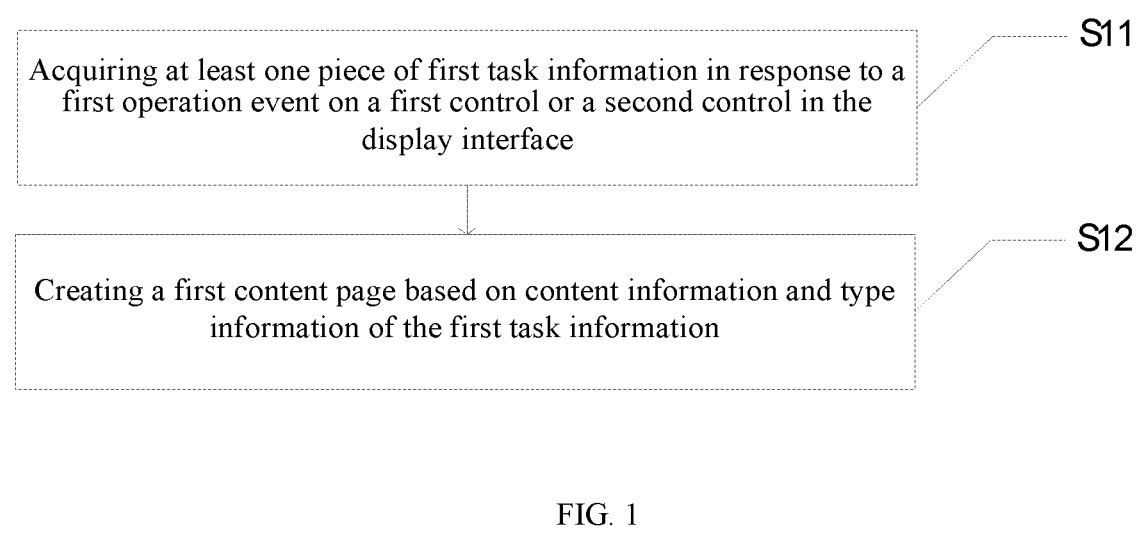

S11

Acquiring at least one piece of first task information in response to a first operation event on a first control or a second control in the display interface

S12

Creating a first content page based on content information and type information of the first task information

FIG. 1

INFORMATION PROCESSING METHOD AND APPARATUS, TERMINAL, AND STORAGE MEDIUM

CROSS REFERENCE

This application is the U.S. National Stage of International Application No. PCT/CN2022/089585, filed on Apr. 27, 2022, filed based on the Chinese patent application No. 202110535366.9 with a filing date of May 17, 2021, and a title of "Information processing method and apparatus, terminal and storage medium", and claims priority to the Chinese Patent Application, both of which are incorporated herein by reference in their entireties.

TECHNICAL FIELD

The present disclosure relates to the field of information processing technology, and particularly to information processing method and apparatus, a terminal and a storage medium.

BACKGROUND

In projects, people often have associated tasks, such as created tasks, responsible tasks, participating tasks, and the like. During the performance of a task, it is sometimes necessary to report the progress of the task or to summarize the task.

SUMMARY

To solve an existing problem, the present disclosure provides an information processing method and apparatus, terminal and storage medium.

The present disclosure adopts the following technical solutions.

In some embodiments, the present disclosure provides an information processing method, comprising:

acquiring at least one piece of first task information in response to a first operation event on a first control or a second control in the interface; and creating a first content page based on content information and type information of the first task information;

wherein the first content page is configured to carry association information of the first task information; and the type information comprises first type information and/or second type information, and the second type information has an associated relationship with the first type information.

In some embodiments, the present disclosure provides an information processing apparatus, comprising:

a determining unit, configured to acquire at least one piece of first task information in response to a first operation event on a first control or a second control in a display interface; and a control unit, configured to create a first content page based on content information and type information of the first task information;

wherein the first content page is configured to carry association information of the first task information, the type information comprises first type information and/or or second type information, and the second type information has an associated relationship with the first type information.

In some embodiments, the present disclosure provides a terminal, comprising: at least one memory and at least one processor;

wherein the at least one memory is configured to store program code, and the at least one processor is configured to invoke the program code stored by the at least one memory to perform the method of any one of the method above.

In some embodiments, the present disclosure provides a storage medium configured to store program code, the program code being configured to perform the method of any one of the method above.

An information processing method provided by an embodiment of the present disclosure includes: acquiring, in the display interface, at least one piece of first task information in response to a first operation event on a first control or a second control; and creating a first content page based on content information and type information of the first task information; wherein the first content page is configured to carry association information of the first task information; and the type information includes first type information and/or second type information, and the second type information has an associated relationship with the first type information. The method proposed in the embodiment of the present disclosure is capable of facilitating a user's progress on creating a first content page matching the first task information, thereby facilitating the user to report the first task information.

BRIEF DESCRIPTION OF FIGURES

The foregoing and other features, advantages, and aspects of embodiments of the present disclosure will become more apparent in conjunction with the accompanying drawings and with reference to the following specific embodiments. Throughout the accompanying drawings, the same or similar accompanying symbols indicate the same or similar elements. It should be understood that the accompanying drawings are schematic and that elements and elements are not necessarily drawn to scale.

FIG. 1 is a flowchart of an information processing method according to an embodiment of the present disclosure.

DETAILED DESCRIPTION

Embodiments of the present disclosure will be described in greater detail below with reference to the accompanying drawings. Although certain embodiments of the present disclosure are shown in the accompanying drawings, it should be understood, however, that the present disclosure may be realized in various forms and should not be construed as being limited to the embodiments set forth herein, but rather are provided for a more thorough and complete understanding of the present disclosure. It should be understood that the accompanying drawings and embodiments of the present disclosure are for exemplary purposes only and are not intended to limit the scope of protection of the present disclosure.

It should be understood that the individual steps documented in the method embodiments of the present disclosure may be performed in accordance and/or in parallel. Furthermore, the method embodiments may include additional steps and/or omit performing the illustrated steps. The scope of the present disclosure is not limited in this regard.

As used herein, the term "including" and variations thereof are open-ended, i.e., "including but not limited to." The term "based on" is "based at least in part on." The term "one embodiment" means "at least one embodiment"; the term "another embodiment" means "at least one additional embodiment"; the term "another embodiment" means "at least one other embodiment."; and the term "some embodiments" means "at least some embodiments". Related definitions of other terms will be given in the following description.

It should be noted that the concepts of "first", "second" and the like mentioned in the present disclosure are only used to distinguish different devices, modules or units, and are not used to define the order or interdependence of the functions performed by these devices, modules or units.

It should be noted that the modification of "one" mentioned in the present disclosure is schematic and not restrictive, and the person skilled in the art should understand that it should be understood as "one or more" unless otherwise explicitly stated in the context.

The names of the messages or information interacting between the plurality of devices in the presently disclosed embodiments are for illustrative purposes only and are not intended to limit the scope of such messages or information.

The embodiments provided by the embodiments of the present disclosure will be described in detail below in connection with the accompanying drawings.

An information processing method is proposed in some embodiments of the present disclosure, as shown in FIG. 1, including steps S11-S12 as follows.

S11: at least one piece of first task information is acquired in response to a first operation event on a first control or a second control in the display interface.

Figure 2:
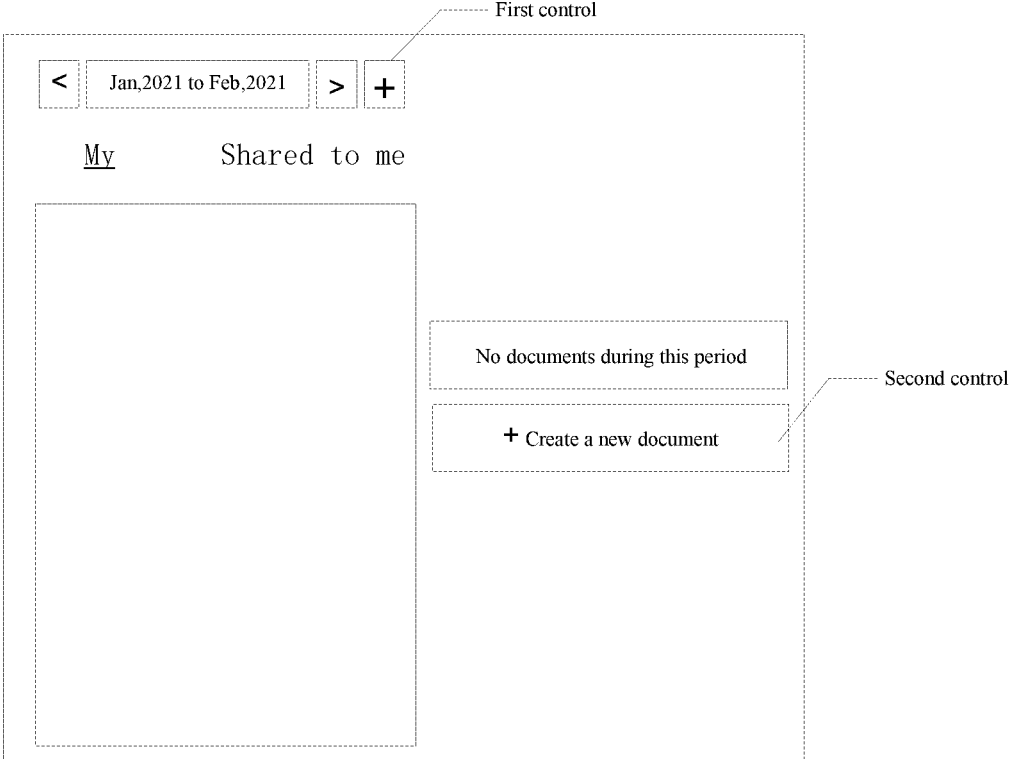
FIG. 2 is a schematic diagram of a display interface before a first content page is created according to an embodiment of the present disclosure.

In some embodiments, please refer to FIG. 2, there may be one or both of a first control and a second control displayed in the display interface, the first control and the second control may be displayed in response to some operations, e.g. the first control and the second control may be displayed in response to a specific gesture operation or in response to the situation that some specific controls are triggered, the first operation event may be one or more operations, after the first operation event is executed on, the first control or the second control, the first task information is acquired from the task information, one or more pieces of task information may be displayed, the first task information is selected by the user, and in other embodiments, the first task information satisfying a certain condition may be automatically acquired without selection by the user.

In some embodiments, the task information may be content information that the user wants to acquire based on his or her needs, for example, the user needs to read an article and edit/annotate the article, then the task information may be the content of the article; or the user needs to view a certain webpage, then the task information may be the content of the webpage; or the user needs to process a schedule/to-do list, then the task information may be schedule content or to-do list content. The content information included in the task information may be various media information such as words, pictures, audio or video.

S12: a first content page is created based on content information and type information of the first task information.

In some embodiments, the first content page is configured to carry association information of the first task information. The association information may be, for example, description information of the first task information, current situation description information, etc., and the type information includes first type information and/or second type information, and the second type information has an associated relationship with the first type information. In some embodiments, the type information of the first task information may include one piece of the first type information or the second type information, or both of the first type information and the second type information. The first type information may be parent information, and the second type information is child information of the parent information; or, the first type information is first level information and the second type information is second level information. That is, the first type information and the second type information are different information having a certain associated relationship, the first type information and the second type information follow the same information rule, or have the same content subject, or are both associated with specific content information. The first content page is generated based on the first task information, when the content information or the type information included in the first task information are different, the category of the created first content page may be different. A first type content page is created, for example, when the first task information includes only the first type information, and a second type content page is created when the type information included in the first task information includes both the first type information and the second type information, so that the type of the first content page created is adapted to the type of the first task information, i.e. the type of the first content page may depend on the type information of the first task information, so that the style or display format in the first content page is adapted to the type information of the first task information. For example, when the type information of the first task information is a data type, the first content page may be set to be a data type content page, when the type information of the first task information is a chart type, the first document may be set to be a chart type content page; the first content page may also be an online document, a local file, an application page, a software page, or a web page that includes display content. Based on the type information of the first task information, the content information of the first task information may be included or not included in the first content page. In some embodiments of the present disclosure, the first content page is created according to the content information and the type information of the first task information, so that it can be convenient for the user to create the first content page matching the first task information, and it can be convenient for the user to present and explain the first task information.

In some embodiments of the present disclosure, the step that the first content page is created includes: a content block is created in a body region of the first content page in response to that type information of the first task information includes first type information and second type information, the content block being configured to carry content information of the first task information; in some embodiments, when the type information of the first task information includes both the first type information and the second type information, the content block is created in the created first content page, the content block may be a unit carrying content of the first content page, the content block may be displayed in a preset data format, and one piece of first task information may be carried in a content block. In some embodiments of the present disclosure, the first task information is displayed in the form of a content block, instead of displaying the first task information as purely textual information, in this way, the display of the first task information is structured, the structure of the presentation of information in the first content page is improved, thus enabling better presentation of first task information, since the first type information and the content information associated with the second type information are both displayed in one content block, the associated relationship between the content information of the first type information and the second type information can be better displayed, so that the structure of display, the discrimination of the first task information from other contents, and the use experience of the user are improved.

In some embodiments of the present disclosure, the step that the first content page is created includes: content is maintained unchanged in a body region of the first content page in response to that type information of the first task information includes first type information and does not includes second type information. In some embodiments, in a case that the type information of the first task information does not include the second type information, no modification is made to the body region of the first content page, the number of the pieces of the first task information may be multiple, i.e., there is first task information that does not generate a corresponding content block in the body region of the first content page. The first task information is distinguished in such a way that only specific first task information is displayed in the body region of the first content page, thereby eliminating the need for manual adjustment or deletion by the user.

In some embodiments of the present disclosure, in response to that the type information of the first task information includes the first type information and the second type information, content information corresponding to the first type information is displayed in a first sub-region of the content block, and content information corresponding to the second type information is displayed in a second sub-region of the content block. In some embodiments, please refer to FIG. 3, there are two content blocks shown in the region on the right of FIG. 3, one piece of first task information is displayed in one content block, the content block in which the first task information is located has a first sub-region and a second sub-region therein, the first sub-region displays content information corresponding to the first type information, the second sub-region displays content information corresponding to the second type information, so that the content information corresponding to the first type information and the second type information are displayed in different regions of the content block, respectively, so that the content information corresponding to the first type information and the second type information can be structurally distinguished. In some embodiments, there may be a plurality of pieces of content information corresponding to the second type information, so that there may be a plurality of second sub-regions, and content information tion corresponding to one piece of second type information is displayed in one second sub-region.

In some embodiments of the present disclosure, the step that the first content page is created includes: in response to that the type information of the first task information includes the first type information and does not includes the second type information, title information corresponding to the first task information is displayed in a title region of the first content page, and null information is displayed in a body region of the first content page. In some embodiments, when the type information of the first task information includes the first type information and does not includes the second type information, the content information corresponding to the first type information can be displayed as title information, the first document thus generated can directly user the content information corresponding to the first type information as a title, thus, the presentation manner of the first task information is formatted, and the user can write relevant information about the first task information, such as progress information, in the null information displayed in the body region, thereby facilitating the user to report the progress of the first task information and enhancing the user's experience.

In some embodiments of the present disclosure, the title information is determined based on at least one of: key word information of the first task information, selected time period information, user information logging into a currently displayed interface, and user information to which the first task information belongs. In some embodiments, the keyword information of the first task information may be set in advance, may also be extracted from the first task information according to a preset rule, the selected time period information may be a time period which is bound and selected for the first task information in advance, the user information logging into the currently displayed interface may be a user name or a user code, the user information to which the first task information belongs may be creator information, responsible person information, etc. of the first task information.

In some embodiments of the present disclosure, in response to that the type information of the first task information includes the first type information and the second type information, the method further includes: content information corresponding to the second type information is displayed at a second sub-region of the content block where the first task information is located, wherein the second sub-region is associated with an information interaction component. In some embodiments, one piece of first task information may have content information corresponding to one or more pieces of second type information, the content information corresponding to one piece of second type information is displayed in a second sub-region, a second sub-region may correspond to an information interaction component, this can facilitate the user to input information related to the corresponding second type information in the information interaction component, in some embodiments, please refer to FIG. 3, two content blocks are shown in the right region of FIG. 3, taking the content block above the right region of FIG. 3 as an example, there are content information corresponding to two pieces of second type information in the first task information in the content block, the second sub-region displayed by the content information corresponding to the second type information displays an information interaction component, the information interaction component may be an input box, relevant information of the content information corresponding to the corresponding second type information, such as progress information, is input in the information interaction component, thereby facilitating the user to generate a progress report of the first task information. In some embodiments, when there is no content input in the information interaction control, a preset placeholder ("Please enter progress" in FIG. 3) may be displayed in the information interaction control, thereby reminding the user that information may be input in the information interaction control, the preset placeholder may be hidden when the information interaction control is selected, and the preset placeholder may be deleted after information is input in the information interaction control.

Figure 3:
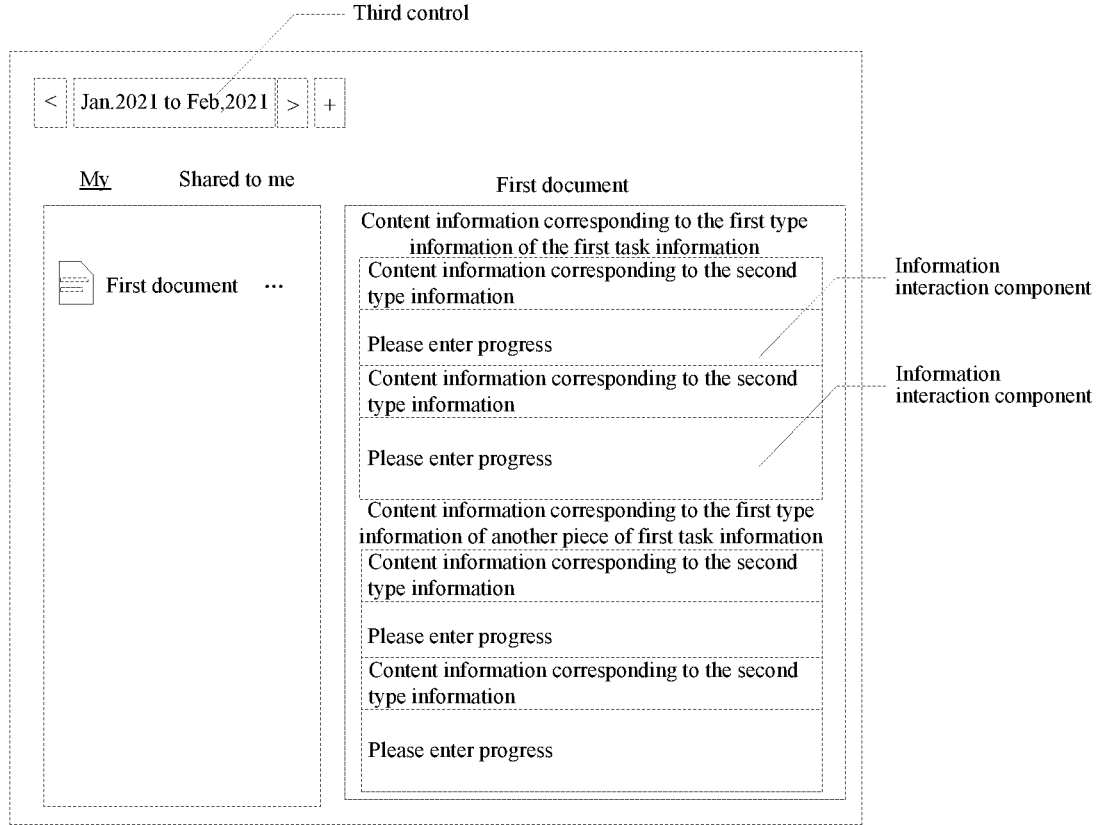
FIG. 3 is a schematic diagram of a display interface after a first content page is created according to an embodiment of the present disclosure.

In some embodiments of the present disclosure, the display interface displays a third control, the third control is configured to select a time period, the first task information is task information associated with a time period selected by the third control; in some embodiments, referring to FIG. 3, a third control is shown in the upper left corner of FIG. 3, through which a time period can be selected, and the first task information determined after the first control or the second control is triggered is associated with the selected time period in the third control, e.g., a completion node of the first task information is located within the selected time period. The time period selected in the third control may be a time period before a certain time point, after a certain time point, or within two time points. In some embodiments, a plurality of time periods may be selected in the third control, i.e. a plurality of discrete time periods can be selected in the third control, in the case where a plurality of time periods are selected in the third control, the first task information displayed in the first document may be arranged according to the time periods to which it belongs, and the display style of the first task information belonging to different time periods may be different to distinguish the display and improve the resolution.

In some embodiments of the present disclosure, the type of time period includes a first type time period and a second type time period. If the time period is the first type time period, the first type time period is hidden in the third control, i.e., the first type time period is not displayed in the third control. The first type time period may be a time period set to be hidden or a time period without associated task information. In some embodiments, if the time period is the second type time period, a preset marker is displayed when the second type time period is displayed by the third control, the preset marker is configured to identify the second type time period. In some embodiments, if the time period is the second type time period, first prompt information is displayed after executing a second operation event in the second type time period displayed by the third control. For example, the second type time period may be a time period set to be invalid, there may be no task information in an unfinished state within the time period set to be invalid, while the third control displays the second type time period, "invalid" is displayed as a preset marker near the second type time period to identify the second type time period. The second operation event may be, for example, hovering a control identifier over the second type time period displayed in the third control, and after hovering, "the administrator has marked the period as invalid" can be displayed to remind the user. By classifying time periods, alternative time periods in the third control can be reduced, so that the user does not need to select from a large number of time periods when selecting time periods, only valid time periods can be displayed, and the number of operations performed when the user changes the selected time periods in the third control can be reduced.

In some embodiments of the present disclosure, the first task information is task information associated with the current user. In some embodiments, after the first operation event is executed in the first control or the second control, the task information associated with the time period selected in the third control and the current user at the same time may be determined, the task information can be automatically taken as the first task information, or the task information can be displayed, and the user selects the first task information from the task information. In some embodiments of the present disclosure, all the task information associated with the current user and within the time period selected in the third control may be automatically acquired, and the first document is generated, so that the document of the task information related to the current user is directly generated, thus facilitating the user to generate a progress report of the task information.

In some embodiments, the number of pieces of the first task information can be at least 2, for first task information including the first type information and the second type information in the type information, for the first task information including only the first type information and not the second type information in the type information, no corresponding content block is created in the first content page, if there is only the first type information and no second type information among all the type information of the first task information, no content block is created in the first content page, at this time the first content page may be in a blank state.

In some embodiments of the present disclosure, the step that the first content page is created includes: a first document is created, the first content page being a content page of the first document, the first document is a local document or an online document. In some embodiments, when the first document is a local document, the first document may be stored at an executor of the disclosure, and when the first document is an online document, the first document may be stored in a remote document space. In some embodiments, the generated first document has a default name, the default name can be modified, in some embodiments, the default document name includes the username of the current user, thereby identifying a creator of the first document, preset content and/or time may also be included in the default document name, the preset content may be "progress report", the preset content can be modified, time is the time when the first document is created by default, may include year, month, day, hours, minutes and seconds, such a default document name may be "username+preset content+time", in some embodiments, the name of the document label is the same as the name of the document and they are automatically synchronized, and in some embodiments, after the name of the document or the name of the document label is modified, the time in the name may be automatically updated and automatically adjusted to the time of modification, thus eliminating the need for manual modification by the user.

In some embodiments of the present disclosure, the step that the first document is created includes: the first document is created in the display interface and/or the first document is created in a document space associated with a current user. In some embodiments, the first document created in the display interface may be stored locally, i.e., at the execution end of the method, the first document created in the document space may be stored at a server, and the first document in the display interface may be synchronized with the first document in the document space in real time, at a fixed time, or at an irregular time.

In some embodiments of the present disclosure, the display interface includes a first region and a second region; the first region is configured to display a document label and the second region is configured to display document content of a document associated with a selected document label within the first region; and after the first document is created, a first document label of the first document is displayed in the first region and the first document label is selected. In some embodiments, please refer to FIG. 3, a first region is on the left side of FIG. 3 and a second region is on the right side of FIG. 3, when a plurality of document labels are displayed in the first region, a selected document label may be displayed in a different style from an unselected document label, e.g., a selected document label may be highlighted. In some embodiments, the associated region of the document label displays a document symbol that may be associated with the document category of the document, e.g., the document symbol of the document that includes task information is different from the document symbol of the document that does not include task information, thereby enabling a user to directly determine which document has task information therein.

In some embodiments of the present disclosure, as shown in FIGS. 2 and 3, the first control is displayed in the first region so that it can be created when first document content needs to be created, and in some embodiments, the second control is displayed in the second region when there is no document label in the first region. When there is a document label in the first region, the second control is not displayed, so that by whether displaying the second control or not, whether there is a document label in the first region can be reflected.

In some embodiments of the present disclosure, the first region displays a first identifier and a second identifier, the first identifier is configured to display a first sub-interface in the first region after being triggered, and the second identifier is configured to display a second sub-interface in the first region after being triggered; the first sub-interface is configured to display a document label of a document created by the current user, and the second sub-interface is configured to display a document label of a document not created by the current user and associated with the current user. In some embodiments, as shown in FIG. 3, on the left side of FIG. 3, "My" is the first identifier and "Shared to me" is the second identifier, and after the first identifier or the second identifier is triggered, the style of the triggered identifier is changed and the corresponding sub-interface is displayed, in this way, the source of the document label is distinguished through the first sub-interface and the second sub-interface, and it is convenient for the user to quickly find the corresponding document label. In some embodiments, only one of the first identifier and the second identifier can be triggered at the same time, i.e., the first sub-interface and the second sub-interface are not displayed simultaneously. In some embodiments, the second control is displayed in the second region when the first sub-interface is in the display state, and if the second sub-interface is in the display state, the second control is not displayed because the document label of the created document should belong to the first sub-interface, and when the second sub-interface is in the display state, the second control should not be provided to prevent user confusion. In some embodiments, the document labels in the first sub-interface and/or the second sub-interface are arranged by creation time from near to far or from far to near.

Figure 4:
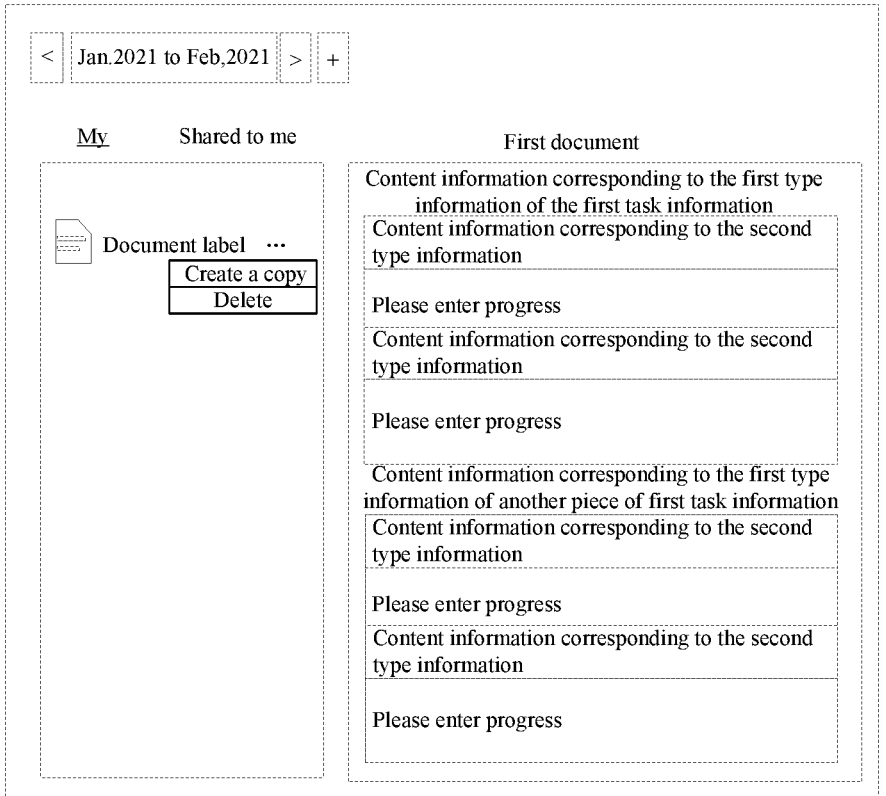
FIG. 4 is a schematic effect diagram of a display interface after an option control is triggered according to an embodiment of the present disclosure.

In some embodiments of the present disclosure, the method further includes: the second document label is deleted from the first region in response to a triggering operation of a fourth control associated with a second document label of the first region. In some embodiments, the second document label may be either document label, e.g. may be a first document label of a first document, please refer to FIG. 4, in which there is an option control in the first region, for example shown as " . . . ", the option control is associated with a document label, one document label may be associated with one option control, a fourth control, such as "delete" shown in FIG. 4, is displayed after the option control is triggered. The second document label is deleted after the fourth control is triggered. In some embodiments, after the second document label is deleted, the second document associated with the second document label may be deleted locally and/or in the document space. After the triggering operation on the fourth control is detected, before deleting the second document label, a pop-up window may be displayed to ask whether the deletion is confirmed, the second document label is deleted after confirmation in the pop-up window, the second document label is not deleted after the pop-up window is closed or cancelled. Prompt information may be displayed after the second document label is deleted to prompt that the deletion is successful.

In some embodiments of the present disclosure, a second document associated with the second document label stored in a document space is deleted when the second document label is deleted from the first sub-interface if the second document label is a document label displayed on a first sub-interface. In some embodiments, a second document associated with the second document label stored in a document space is reserved when the second document label is deleted from the second sub-interface if the second document label is a document label located at a second sub-interface.

In some embodiments, the document space may be located on a server, which stores a second document associated with a second document label, depending on whether the document label is located at the first sub-interface or the second sub-interface, the second document to which the second document label corresponds is reserved or deleted, this enables differentiation, because the document label in the second sub-interface is not created by the current user, a deletion operation on the document label in the document sub-interface by the current user should not affect the second document, otherwise the user creating the second document will not be able to view the document created himself in the document space, while the first sub-interface is the document label for the document created by the current user, so the second document in the document space can be deleted if the second document label is displayed in the first sub-interface.

In some embodiments of the present disclosure, the method further includes: after deleting the second document label from the first region, document content of a third document is presented in the second region; wherein the third document is associated with a third document label, the third document label is a document label that is displayed adjacent to the second document label in the first region before the second document label is deleted. In some embodiments, prior to deleting the second document label, the third document label is displayed adjacent to the second document label, e.g., as the next document label for the second document label, and the second document label is automatically selected upon deletion of the second document label, so that the next selected document label needs to be determined after the second document label is deleted, at this time, the adjacent third document label is selected by default.

In some embodiments of the present disclosure, if the second document label is a document label displayed on the first sub-interface, after deleting the second document label from the first sub-interface, first reminding information is displayed in the second region if there is no other document label in the first sub-interface. The first reminding information may be, for example, "No documents during this period". In some embodiments, if the second document label is a document label displayed on a second sub-interface, after deleting the second document label from the second sub-interface, second reminding information is displayed in the second region if there is no other document label in the second sub-interface. The second reminding information may be, for example, "No documents shared to you during this period". In some embodiments, the second sub-interface displays a search control, such as a search box, configured to search a document label satisfying a condition in the second sub-interface, and if all document labels in a search result obtained by searching through a search control are deleted, third reminding information is displayed in the second region. The third reminding information may be, for example, "No documents meeting the search conditions".

Figure 5:
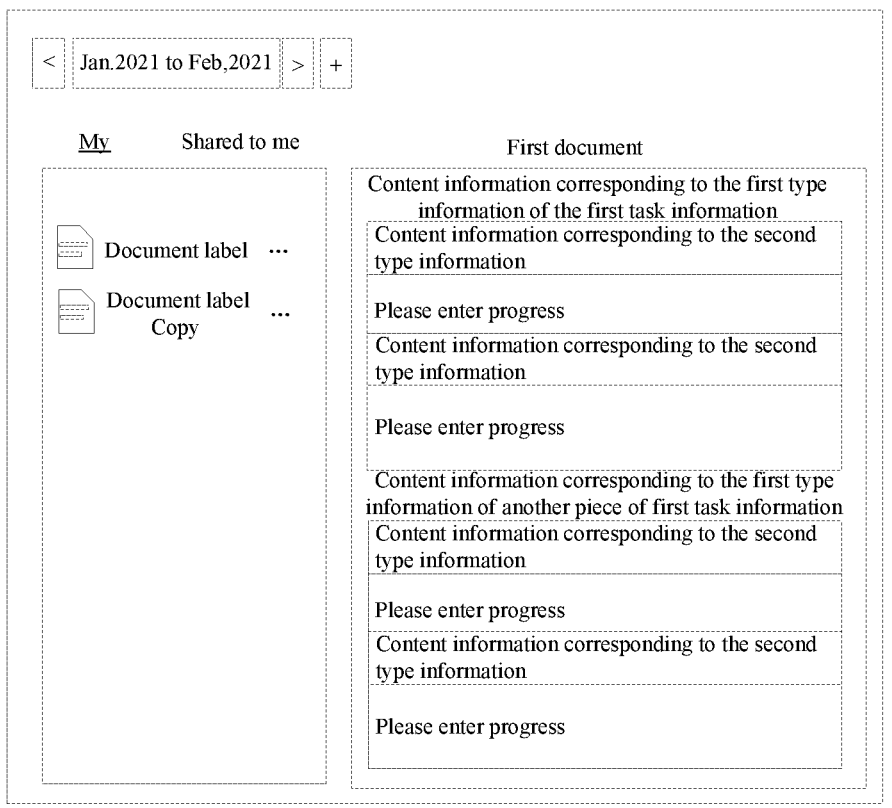
FIG. 5 is a schematic diagram of a display interface after a document copy is created according to an embodiment of the present disclosure.

In some embodiments of the present disclosure, the method further includes in response to a triggering operation of a fifth control associated with a fourth document label within the first region, a fifth document label is created based on the fourth document label and the fifth document label is displayed at the first region. In some embodiments, a fifth document associated with the fifth document label is further created based on the fourth document associated with the fourth document label after the fifth control is triggered, as shown in FIG. 4, a fifth control ("Create a copy" in FIG. 4) may be displayed after the option control is triggered. The fifth control may be, for example, a control for creating a copy, so that a user can quickly create a copy through the fifth control and can create a fifth document with the document content of the fourth document (see FIG. 5).

In some embodiments of the present disclosure, after the fifth control is triggered, whether a current user has a first permission is judged; a fifth document label is created based on the fourth document label if the current user has the first permission; and fourth reminding information is displayed if the current user does not have the first permission. In some embodiments, permission verification is performed during creation of the fifth document label, particularly when the fourth document label is located at the second sub-interface, the fourth document associated with the fourth document label is not created by the current user, and thus it is necessary to determine whether the current user has the sufficient permission to create the fifth document label based on the fourth document label. In some embodiments, whether the current user has the first permission may be determined only when the fourth document label is located at the second sub-interface, and whether the current user has the first permission may not be determined when the fourth document label is located at the first sub-interface.

In some embodiments of the present disclosure, the name of the fifth document label is generated based on the name of the fourth document label, for example, the fifth document label may contain the fourth document label, this indicates that the fifth document label has a certain relationship with the fourth document label, for example, the name of the fifth document label may be a combination of the name of the fourth document label and preset information, and the user may continue to trigger the fifth control associated with the fifth document label, thereby continuing to create the document label. In some embodiments, after the fifth document label is created, the fifth document label is selected by default such that the content of the fifth document label is displayed in the second region.

In some embodiments, if the fourth document label is displayed on the first sub-interface, the fifth document label is displayed on the first sub-interface, and if the fourth document label is displayed on the second sub-interface, the fifth document label is displayed on the first sub-interface. In some embodiments, the fifth document to which the fifth document label is associated is generated by the operation of the current user, and therefore the fifth document label should be displayed on the first sub-interface regardless of whether the fourth document label is displayed on the first sub-interface or the second sub-interface.

Figure 6:
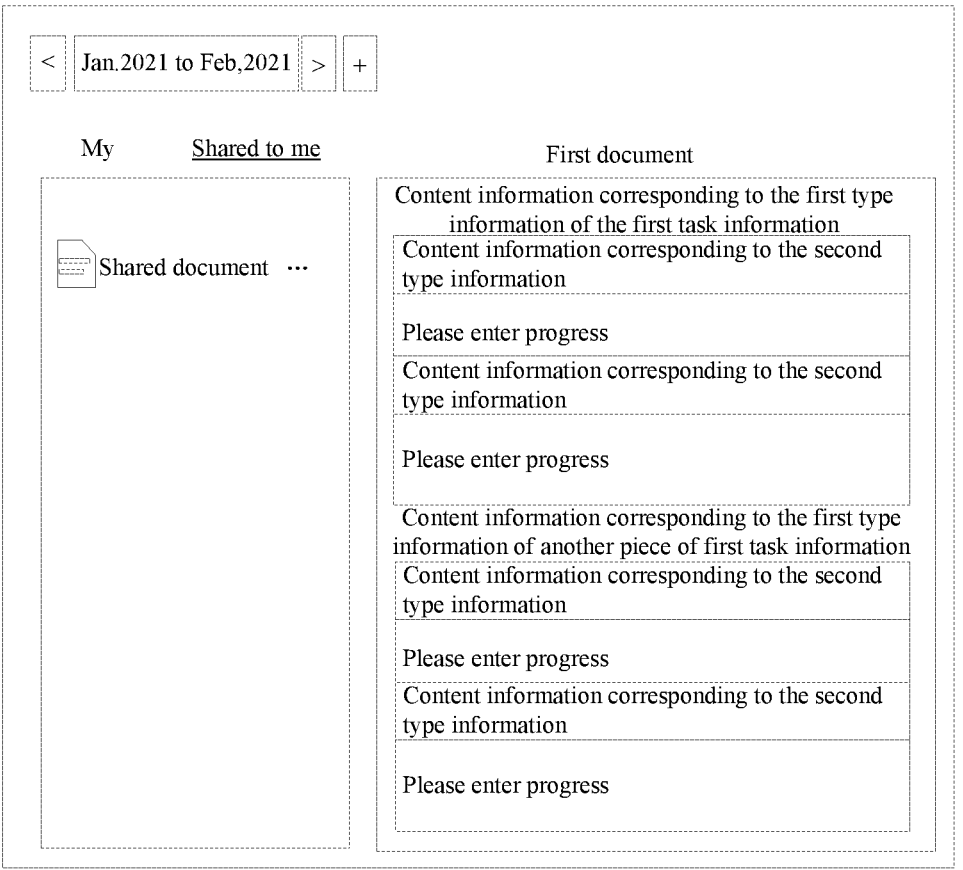
FIG. 6 is a schematic diagram of a display interface after a second identifier is triggered according to an embodiment of the present disclosure.

In some embodiments, a search control is displayed in the second sub-interface, in response to search content input in the search control, the search content is searched in a name of a document label in the second sub-interface and/or document content of a document associated with the document label of the second sub-interface and a search result is displayed. In some embodiments, please refer to FIG. 6, a search control is displayed in the second sub-interface, a preset placeholder is displayed when there is no content input in the search control, and the preset placeholder is hid when there is content input in the search control, in some embodiments, the search control supports fuzzy search, but does not perform word segmentation search, the search control does not distinguish the case of search content, if there is no search result corresponding to the search content, no search result may be displayed, after the search content is input, a clearing identifier is displayed in the search control for clearing the content input in the search control after being triggered.

In some embodiments of the present disclosure, a first content page is created, the first content page includes a third region and a fourth region, the third region is configured to display content information of the first task, the fourth region includes an information interaction control, the information interaction control is configured to receive first association information of the first task, the fourth region is displayed at an association position of the third region. In some embodiments, the information interaction control may be, for example, an information input box, the first association information input in the information interaction control may be automatically associated with the content information of the first task, so that no manual operation by the user is required, the first association information may be, for example, progress information of the first task. In some embodiments, if the first task already has association information prior to being inserted into the first document, the association information already present in the first task may be automatically inserted into the first information interaction control to reduce user operations.

In some embodiments of the present disclosure, the step that the first content page is created includes: in response to that the type information of the first task information includes the first type information and the second type information, the third region includes a first sub-region and a second sub-region, wherein the first sub-region is configured to display content information to which the first type information corresponds, the second sub-region is configured to display content information to which the second type information corresponds; and the fourth region is displayed at an associated position of the second sub-region, wherein, when the first task information includes a plurality of pieces of second type information, each piece of second type information corresponds to a respective fourth region, and input content received in each fourth region is associated with the second type information corresponding to the second sub-region.

In some embodiments, the content information includes a plurality of pieces of content information corresponding to the second type information, and the content information corresponding to each piece of second type information is corresponding to a respective fourth area, so that the association information can be respectively input for the content information corresponding to each piece of second type information. For example, when there are a plurality of pieces of node information under the first task information, the association information can be conveniently input for each piece of node information, and the association information can be, for example, the progress information.

Also proposed in an embodiment of the present disclosure is an information processing apparatus, including: a determining unit, configured to acquire at least one piece of first task information in response to a first operation event on a first control or a second control, in a display interface; and a control unit, configured to create a first content page based on content information and type information of the first task information; wherein the first content page is configured to carry association information of the first task information, the type information includes first type information and/or second type information, and the second type information has an associated relationship with the first type information.

As for the embodiments of the apparatus, since they are substantially corresponding to the method embodiments, reference is made to the partial description of the method embodiments. The apparatus embodiments described above are merely illustrative, wherein the modules illustrated as separate modules may or may not be separate. Some or all of the modules may be selected according to actual needs to achieve the objectives of the embodiments. Those of ordinary skill in the art can understand and implement without inventive step.

Above, the method and apparatus of the present disclosure are explained based on embodiments and application examples. In addition, the present disclosure also provides a terminal and a storage medium, which are described below.

Figure 7:
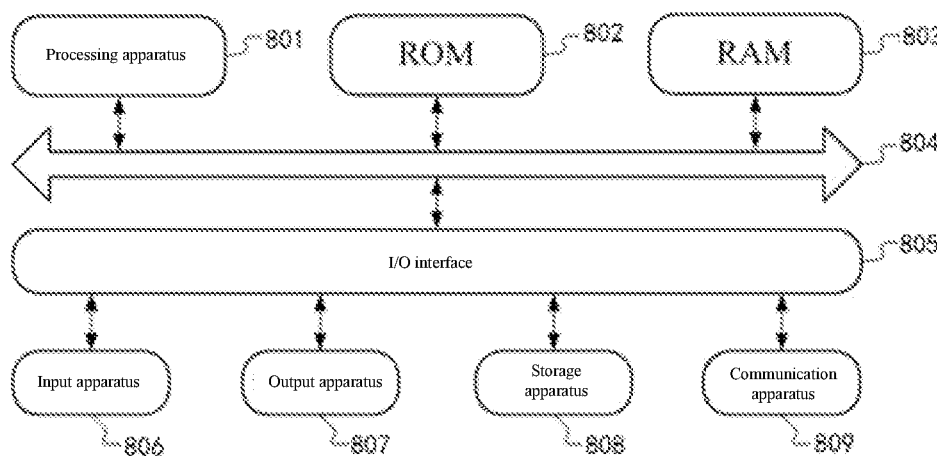
FIG. 7 is a structural schematic diagram of an electronic device according to an embodiment of the present disclosure.

Reference is made below to FIG. 7, which illustrates a schematic diagram of a structure of an electronic device (e.g., a terminal device or a server) 800 suitable for use in realizing embodiments of the present disclosure. Terminal devices in embodiments of the present disclosure may include, but are not limited to, mobile terminals such as cell phones, laptop computers, digital broadcast receivers, PDAs (personal digital assistants), PADs (tablet computers), PMPs (portable multimedia players), in-vehicle terminals (e.g., in-vehicle navigation terminals), and the like, as well as fixed terminals such as digital TVs, desktop computers, and the like. The electronic device illustrated in the drawings is merely an example and should not impose any limitation on the functions and scope of use of the embodiments of the present disclosure.

The electronic device 800 may include a processing apparatus (e.g., a central processor, a graphics processor, etc.) 801 that may perform various appropriate actions and processes based on programs stored in read-only memory (ROM) 802 or loaded from the storage apparatus 808 into random access memory (RAM) 803. Also stored in the RAM 803 are various programs and data necessary for the operation of the electronic device 800. The processing apparatus 801, the ROM 802, and the RAM 803 are connected to each other via a bus 804. An input/output (I/O) interface 805 is also connected to the bus 804.

Typically, the following devices may be connected to the I/O interface 805: an input apparatus 806 including, for example, a touch screen, a touch pad, a keyboard, a mouse, a camera, a microphone, an accelerometer, a gyroscope, and the like; an output apparatus 807 including, for example, a liquid crystal display (LCD), a loudspeaker, a vibrator, and the like; a storage apparatus 808 including, for example, a magnetic tape, a hard disk, and the like; and a communication apparatus 809. The communication apparatus 809 may allow the electronic device 800 to communicate wirelessly or wiredly with other devices to exchange data. Although electronic device 800 with various devices is illustrated in the figures, it should be understood that it is not required to implement or have all of the illustrated devices. More or fewer devices may alternatively be implemented or possessed.

In particular, according to embodiments of the present disclosure, the process described above with reference to the flowchart may be implemented as a computer software program. For example, embodiments of the present disclosure include a computer program product comprising a computer program carried on a computer-readable medium, the computer program comprising program code for performing the method shown in the flowchart. In such embodiments, the computer program may be downloaded and installed from a network via a communication apparatus 809, or from a storage apparatus 808, or from a ROM 802. In the event that the computer program is executed by the processing device 801, the above-described functions defined in the method of an embodiment of the present disclosure are performed.

It is noted that the computer-readable medium described above in the present disclosure may be a computer-readable signaling medium or a computer-readable storage medium or any combination thereof. The computer-readable storage medium may, for example, be—but is not limited to—a system, device, or apparatus, or device of electricity, magnetism, light, electromagnetism, infrared, or semiconductors, or any combination of the above. More specific examples of computer-readable storage media may include, but are not limited to: electrical connections having one or more wires, portable computer disks, hard disks, random access memory (RAM), read-only memory (ROM), erasable programmable read-only memory (EPROM or flash memory), optical fibers, portable compact disk read-only memories (CD-ROM), optical storage devices, magnetic memory device, or any suitable combination of the foregoing. In the context of the present disclosure, a computer-readable storage medium may be any tangible medium containing or storing a program that may be used by or in combination with an instruction execution system, apparatus, or device. And in the context of the present disclosure, a computer-readable signal medium may include a data signal propagated in a baseband or as part of a carrier that carries computer-readable program code. Such propagated data signals may take a variety of forms, including, but not limited to, electromagnetic signals, optical signals, or any suitable combination of the foregoing. The computer-readable signal medium may also be any computer-readable medium other than a computer-readable storage medium that sends, propagates, or transmits a program for use by, or in combination with, an instruction-executing system, apparatus, or device. The program code contained on the computer-readable medium may be transmitted using any suitable medium, including, but not limited to: wire, fiber optic cable, RF (radio frequency), etc., or any suitable combination of the foregoing.

In some implementations, the client, server may communicate utilizing any currently known or future developed network protocol such as HTTP (HyperText Transfer Protocol), and may be interconnected with digital data communications (e.g., communication networks) of any form or medium. Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above-described computer-readable medium may be contained in the above-described electronic device; or it may be separate and not assembled into the electronic device.

The above-described computer-readable medium carries one or more programs that, when the above-described one or more programs are executed by the electronic device, cause the electronic device to perform the above-described method of the present disclosure.

Computer program code for performing the operations of the present disclosure may be written in one or more programming languages or combinations thereof, including object-oriented programming languages—such as Java, Smalltalk, C++—and conventional procedural programming languages—such as the "C" language or the like. "C" or similar programming languages. The program code may be executed entirely on the user's computer, partially on the user's computer, as a stand-alone software package, partially on the user's computer and partially on a remote computer, or entirely on a remote computer or server. In the case involving a remote computer, the remote computer may be connected to the user computer via any kind of network—including a local area network (LAN) or a wide area network (WAN)—or, alternatively, it may be connected to an external computer (e.g., by utilizing an Internet service provider to connect via the Internet).

The flowcharts and block diagrams in the accompanying drawings illustrate the architecture, functionality, and operation of systems, methods, and computer program products that may be implemented in accordance with various embodiments of the present disclosure. At this point, each box in the flowcharts or block diagrams may represent a module, program segment, or portion of code that contains one or more executable instructions for implementing a specified logical function. It should also be noted that in some implementations as replacements, the functions labeled in the boxes may also occur in a different order than those labeled in the accompanying drawings. For example, two consecutively represented boxes may actually be executed substantially in parallel, and they may sometimes be executed in reverse order, depending on the function involved. It is also noted that each of the boxes in the block diagrams and/or flowcharts, and combinations of the boxes in the block diagrams and/or flowcharts, may be implemented with a specialized hardware-based system that performs the specified function or operation, or may be implemented with a combination of specialized hardware and computer instructions.

Units described as being involved in embodiments of the present disclosure may be implemented by way of software or may be implemented by way of hardware. Among other things, the name of a unit does not constitute a limitation of the unit itself in a given situation.

The functions described above herein may be performed, at least in part, by one or more hardware logic components.

For example, non-limitingly, exemplary types of hardware logic components that may be used include: field programmable gate arrays (FPGAs), application-specific integrated circuits (ASICs), application-specific standard products (ASSPs), systems-on-chip (SOCs), complex programmable logic devices (CPLDs), and the like.

In the context of the present disclosure, a machine-readable medium may be a tangible medium that may contain or store a program for use by or in conjunction with an instruction execution system, device, or apparatus. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any suitable combination of the foregoing. More specific examples of machine-readable storage media would include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination of the foregoing. any suitable combination of the above.

According to one or more embodiments, the present disclosure provides an information processing method, comprising:

acquiring at least one piece of first task information in response to a first operation event on a first control or a second control in the interface; and creating a first content page based on content information and type information of the first task information;

wherein the first content page is configured to carry association information of the first task information; and the type information comprises first type information and/or second type information, and the second type information has an associated relationship with the first type information.

According to one or more embodiments, the present disclosure provides an information processing method, wherein creating the first content page comprises:

creating a content block in a body region of the first content page in response to that type information of the first task information comprises first type information and second type information, the content block being configured to carry content information of the first task information; and/or, maintaining content unchanged in a body region of the first content page in response to that type information of the first task information comprises first type information and does not comprises second type information.

According to one or more embodiments, the present disclosure provides an information processing method, wherein, in response to that the type information of the first task information comprises the first type information and the second type information, displaying content information corresponding to the first type information in a first sub-region of the content block, and displaying content information corresponding to the second type information in a second sub-region of the content block.

According to one or more embodiments, the present disclosure provides an information processing method, wherein creating the first content page comprises:

in response to that the type information of the first task information comprises the first type information and does not comprises the second type information, displaying title information corresponding to the first task information in a title region of the first content page, and null information in a body region of the first content page.

According to one or more embodiments, the present disclosure provides an information processing method, wherein the title information is determined based on at least one of: key word information of the first task information, selected time period information, user information logging into a currently displayed interface, and user information to which the first task information belongs.

According to one or more embodiments, the present disclosure provides an information processing method, wherein, in response to that the type information of the first task information comprises the first type information and the second type information, the method further comprises: displaying content information corresponding to the second type information at a second sub-region of the content block where the first task information is located, wherein the second sub-region is associated with an information interaction component.

According to one or more embodiments, the present disclosure provides an information processing method, wherein, the display interface displays a third control, the third control is configured to select a time period, the first task information is task information associated with a time period selected by the third control;

and/or, the first task information is task information associated with a current user.

According to one or more embodiments, the present disclosure provides an information processing method, further comprising:

hiding the first type time period in the third control if the time period is a first type time period; and/or, displaying a preset marker when the third control displays the second type time period if the time period is a second type time period, the preset marker being configured to identify the second type time period; and/or, displaying first prompt information after the second type time period displayed by the third control is executed with a second operation event if the time period is a second type time period.

According to one or more embodiments, the present disclosure provides an information processing method, wherein creating the first content page comprises: creating a first document, the first content page being a content page of the first document.

According to one or more embodiments, the present disclosure provides an information processing method, wherein creating the first document comprises: creating the first document in the display interface and/or creating the first document in a document space associated with a current user.

According to one or more embodiments, the present disclosure provides an information processing method, wherein, the display interface comprises a first region and a second region; the first region is configured to display a document label and the second region is configured to display document content of a document associated with a selected document label within the first region; and after the first document is created, a first document label of the first document is displayed in the first region and the first document label is selected.

According to one or more embodiments, the present disclosure provides an information processing method, wherein, the first control is displayed in the first region;

and/or, the second control is displayed in the second region when there is no document label in the first region.

According to one or more embodiments, the present disclosure provides an information processing method, wherein, the first region displays a first identifier and a second identifier, the first identifier is configured to display a first sub-interface in the first region after being triggered, and the second identifier is configured to display a second sub-interface in the first region after being triggered; the first sub-interface is configured to display a document label of a document created by the current user, and the second sub-interface is configured to display a document label of a document not created by the current user and associated with the current user.

According to one or more embodiments, the present disclosure provides an information processing method, further comprising: deleting the second document label from the first region in response to a triggering operation of a fourth control associated with a second document label of the first region.

According to one or more embodiments, the present disclosure provides an information processing method, wherein, deleting a second document associated with the second document label stored in a document space when the second document label is deleted from the first sub-interface if the second document label is a document label displayed on a first sub-interface; and/or, reserving a second document associated with the second document label stored in a document space when the second document label is deleted from the second sub-interface if the second document label is a document label located at a second sub-interface.

According to one or more embodiments, the present disclosure provides an information processing method, further comprising: after deleting the second document label from the first region, presenting document content of a third document in the second region; wherein the third document is associated with a third document label, the third document label is a document label that is displayed adjacent to the second document label in the first region before the second document label is deleted.

According to one or more embodiments, the present disclosure provides an information processing method, wherein, if the second document label is a document label displayed on the first sub-interface, after deleting the second document label from the first sub-interface, displaying first reminding information in the second region if there is no other document label in the first sub-interface; and/or, if the second document label is a document label displayed on a second sub-interface, after deleting the second document label from the second sub-interface, displaying second reminding information in the second region if there is no other document label in the second sub-interface; and/or, the second sub-interface displaying a search control configured to search a document label satisfying a condition in the second sub-interface, and if all document labels in a search result obtained by searching through the search control are deleted, displaying third reminding information in the second region.

According to one or more embodiments, the present disclosure provides an information processing method, further comprising: in response to a triggering operation of a fifth control associated with a fourth document label within the first region, creating a fifth document label based on the fourth document label and displaying the fifth document label at the first region.

According to one or more embodiments, the present disclosure provides an information processing method, wherein, after the fifth control is triggered, judging whether a current user has a first permission;

creating a fifth document label based on the fourth document label if the current user has the first permission; and displaying fourth reminding information if the current user does not have the first permission.

According to one or more embodiments, the present disclosure provides an information processing method, wherein, generating a name of the fifth document label based on a name of the fourth document label; and/or, selecting the fifth document label by default after the fifth document label is created; and/or, displaying the fifth document label on the first sub-interface if the fourth document label is displayed on the first sub-interface, and displaying the fifth document label on the first sub-interface if the fourth document label is displayed on the second sub-interface.

According to one or more embodiments, the present disclosure provides an information processing method, wherein, displaying a search control in the second sub-interface, in response to search content input in the search control, searching the search content in a name of a document label in the second sub-interface and/or document content of a document associated with the document label of the second sub-interface and displaying a search result.

According to one or more embodiments, the present disclosure provides an information processing method, wherein creating the first content page comprises: creating a first content page, the first content page comprising a third region and a fourth region, the third region being configured to display content information of the first task, the fourth region comprising an information interaction control, the information interaction control being configured to receive first association information of the first task, the fourth region being displayed at an association position of the third region.

According to one or more embodiments, the present disclosure provides an information processing method, wherein creating the first content page comprises: in response to that the type information of the first task information comprises the first type information and the second type information, making the third region comprise a first sub-region and a second sub-region, wherein the first sub-region is configured to display content information to which the first type information corresponds, the second sub-region is configured to display content information to which the second type information corresponds; and displaying the fourth region at an associated position of the second sub-region, wherein, when the first task information comprises a plurality of pieces of second type information, each piece of second type information corresponds to a respective fourth region, and input content received in each fourth region is associated with the second type information corresponding to the second sub-region.

According to one or more embodiments, the present disclosure provides an information processing apparatus, comprising:

a determining unit, configured to acquire at least one piece of first task information in response to a first operation event on a first control or a second control in a display interface; and a control unit, configured to create a first content page based on content information and type information of the first task information; wherein the first content page is configured to carry association information of the first task information, the type information comprises first type information and/or second type information, and the second type information has an associated relationship with the first type information.

According to one or more embodiments, the present disclosure provides a terminal, comprising:

at least one memory and at least one processor;

wherein the at least one memory is configured to store program code, and the at least one processor is configured to invoke the program code stored by the at least one memory to perform the method of any one of above.

According to one or more embodiments, the present disclosure provides a storage medium configured to store program code, the program code being configured to perform the method of any one of above.

The above description is only a preferred embodiment of the present disclosure and an illustration of the technical principles utilized. It should be understood by those skilled in the art that the scope of disclosure involved in the present disclosure is not limited to technical solutions formed by a particular combination of the above technical features, but also covers other technical solutions formed by any combination of the above technical features or their equivalent features without departing from the above disclosed concept. For example, a technical solution formed by interchanging the above features with (but not limited to) technical features with similar functions disclosed in the present disclosure.

What is claimed is:

1. An information processing method, comprising:

displaying at least one control in an interface, wherein the at least one control is configured to create a new document, and the at least one control comprises at least one of a first control or a second control;

receiving a first operation event performed on the at least one control in the interface;

acquiring at least one piece of first task information in response to the first operation event performed on the at least one control in the interface;

creating the new document based on the at least one piece of first task information acquired in response to the first operation event performed on the at least one control;

creating a first content page of the new document, wherein the first content page of the new document has a type from a plurality of types, the type of the first content page is determined based on type information of the at least one piece of first task information, the type information indicates whether the at least one piece of first task information comprises a second type of information in addition to a first type of information, the first type of information is parent information, and the second type of information is child information of the parent information;

creating at least one content block in a body region of the first content page of the new document in response to determining that the at least one piece of first task information comprises the first type of information and the second type of information, wherein the at least one content block corresponds to the at least one piece of first task information; and displaying, in the created at least one content block of the new document, the first type of information in the at least one piece of first task information and content associated with the second type of information in the at least one piece of first task information.

2. The method of claim 1, further comprising:

maintaining content unchanged in the body region of the first content page in response to that the at least one piece of first task information comprises the first type of information and does not comprise the second type of information.

3. The method of claim 1, further comprising:

displaying the first type of information in a first sub-region of the at least one content block, and displaying the content associated with the second type of information in a second sub-region of the at least one content block.

4. The method of claim 1, wherein creating the first content page comprises:

in response to that at least one piece of first task information comprises the first type of information and does not comprise the second type of information, displaying title information corresponding to the at least one piece of first task information in a title region of the first content page, and null information in the body region of the first content page.

5. The method of claim 4, wherein the title information is determined based on at least one of:

key word information of the first task information, selected time period information, user information logging into a currently displayed interface, and user information to which the first task information belongs.

6. The method of claim 1, wherein, the method further comprises: displaying the content associated with the second type of information in a second sub-region of the at least one content block, wherein the second sub-region is associated with an information interaction component;

and/or, the display interface displays a third control, the third control is configured to select a time period, the first task information is task information associated with a time period selected by the third control;

and/or, the first task information is task information associated with a current user.

7. The method of claim 6, further comprising:

in response to the time period being a first type time period, hiding the first type time period in the third control;

and/or, displaying a preset marker when the third control displays a second type time period in response to the time period being the second type time period, the preset marker being configured to identify the second type time period;

and/or, displaying first prompt information after the second type time period displayed by the third control is executed with a second operation event when the time period is the second type time period.

8. The method of claim 1, wherein creating the new document comprises:

creating the new document in the display interface and/or creating the new document in a document space associated with a current user.

9. The method of claim 8, wherein, the display interface comprises a first region and a second region;

the first region is configured to display a document label and the second region is configured to display document content of a document associated with a selected document label within the first region; and after the new document is created, a new document label of the new document is displayed in the first region and the new document label is selected.

10. The method of claim 9, wherein, the first control is displayed in the first region; and/or, the second control is displayed in the second region when there is no document label in the first region;

and/or, the first region displays a first identifier and a second identifier, the first identifier is configured to display a first sub-interface in the first region after being triggered, and the second identifier is configured to display a second sub-interface in the first region after being triggered; the first sub-interface is configured to display a document label of a document created by the current user, and the second sub-interface is configured to display a document label of a document not created by the current user and associated with the current user.

11. The method of claim 10, wherein, displaying a search control in the second sub-interface, in response to search content input in the search control, searching the search content in a name of a document label in the second sub-interface and/or document content of a document associated with the document label of the second sub-interface and displaying a search result.

12. The method of claim 9, further comprising:

deleting the second document label from the first region in response to a triggering operation of a fourth control associated with a second document label of the first region.

13. The method of claim 12, wherein, deleting a second document associated with the second document label stored in a document space when the second document label is deleted from the first sub-interface if the second document label is a document label displayed on a first sub-interface; and/or, reserving a second document associated with the second document label stored in a document space when the second document label is deleted from the second sub-interface if the second document label is a document label located at a second sub-interface;

and/or, the information processing method further comprising: after deleting the second document label from the first region, presenting document content of a third document in the second region; wherein the third document is associated with a third document label, the third document label is a document label that is displayed adjacent to the second document label in the first region before the second document label is deleted;

and/or, if the second document label is a document label displayed on the first sub-interface, after deleting the second document label from the first sub-interface, displaying first reminding information in the second region if there is no other document label in the first sub-interface;

and/or, if the second document label is a document label displayed on a second sub-interface, after deleting the second document label from the second sub-interface, displaying second reminding information in the second region if there is no other document label in the second sub-interface;
and/or,
the second sub-interface displaying a search control configured to search a document label satisfying a condition in the second sub-interface, and if all document labels in a search result obtained by searching through the search control are deleted, displaying third reminding information in the second region.

14. The method of claim 9, further comprising:
in response to a triggering operation of a fifth control associated with a fourth document label within the first region, creating a fifth document label based on the fourth document label and displaying the fifth document label at the first region.

15. The method of claim 14, wherein,
after the fifth control is triggered, judging whether a current user has a first permission;
creating a fifth document label based on the fourth document label if the current user has the first permission; and
displaying fourth reminding information if the current user does not have the first permission;
and/or,
generating a name of the fifth document label based on a name of the fourth document label;
and/or,
selecting the fifth document label by default after the fifth document label is created; and/or,
displaying the fifth document label on the first sub-interface if the fourth document label is displayed on the first sub-interface, and displaying the fifth document label on the first sub-interface if the fourth document label is displayed on the second sub-interface.

16. The method of claim 1, wherein the first content page comprises a third region and a fourth region, the third region being configured to display content information of the first task, the fourth region comprising an information interaction control, the information interaction control being configured to receive first association information of the first task, the fourth region being displayed at an association position of the third region.

17. The method of claim 16, further comprising:
making the third region comprises a first sub-region and a second sub-region, wherein the first sub-region is configured to display content information to which the first type information corresponds, the second sub-region is configured to display content information to which the second type information corresponds; and
displaying the fourth region at an associated position of the second sub-region, wherein, when the first task information comprises a plurality of pieces of second type information, each piece of second type information corresponds to a respective fourth region, and input content received in each fourth region is associated with the second type information corresponding to the second sub-region.

18. A device, comprising:
at least one memory and at least one processor;
wherein the at least one memory is configured to store program code, and the at least one processor is configured to invoke the program code stored by the at least one memory to perform operations comprising:
displaying at least one control in an interface, wherein the at least one control is configured to create a new document, and the at least one control comprises at least one of a first control or a second control;
receiving a first operation event performed on the at least one control in the interface;
acquiring at least one piece of first task information in response to the first operation event performed on the at least one control in the interface;
creating the new document based on the at least one piece of first task information acquired in response to the first operation event performed on the at least one control;
creating a first content page of the new document, wherein the first content page of the new document has a type from a plurality of types, the type of the first content page is determined based on type information of the at least one piece of first task information, the type information indicates whether the at least one piece of first task information comprises a second type of information in addition to a first type of information, the first type of information is parent information, and the second type of information is child information of the parent information;
creating at least one content block in a body region of the first content page of the new document in response to determining that the at least one piece of first task information comprises the first type of information and the second type of information, wherein the at least one content block corresponds to the at least one piece of first task information; and
displaying, in the created at least one content block of the new document, the first type of information in the at least one piece of first task information and content associated with the second type of information in the at least one piece of first task information.

19. A non-transitory storage medium configured to store program code, wherein the program code upon execution by a processor causes the processor to perform operations comprising:
displaying at least one control in an interface, wherein the at least one control is configured to create a new document, and the at least one control comprises at least one of a first control or a second control;
receiving a first operation event performed on the at least one control in the interface;
acquiring at least one piece of first task information in response to the first operation event performed on the at least one control in the interface;
creating the new document based on the at least one piece of first task information acquired in response to the first operation event performed on the at least one control;
creating a first content page of the new document, wherein the first content page of the new document has a type from a plurality of types, the type of the first content page is determined based on type information of the at least one piece of first task information, the type information indicates whether the at least one piece of first task information comprises a second type of information in addition to a first type of information, the first type of information is parent information, and the second type of information is child information of the parent information;
creating at least one content block in a body region of the first content page of the new document in response to determining that the at least one piece of first task information comprises the first type of information and the second type of information, wherein the at least one content block corresponds to the at least one piece of first task information; and displaying, in the created at least one content block of the new document, the first type of information in the at least one piece of first task information and content associated with the second type of information in the at least one piece of first task information.

\* \* \* \* \*